(12) United States Patent
Chang

(10) Patent No.: US 7,401,675 B2
(45) Date of Patent: Jul. 22, 2008

(54) DETACHABLE VEHICLE BODY THAT IS ASSEMBLED AND DISASSEMBLED EASILY AND RAPIDLY

(75) Inventor: Feng-Chu Chang, Hsin Chang (TW)

(73) Assignee: Chienti Enteprise Co., Ltd., Taipei Hsien (TW)

( * ) Notice: Subject to any disclaimer, the term of this patent is extended or adjusted under 35 U.S.C. 154(b) by 296 days.

(21) Appl. No.: 11/253,170

(22) Filed: Oct. 18, 2005

(65) Prior Publication Data

US 2007/0084656 A1    Apr. 19, 2007

(51) Int. Cl.
*B62D 27/06*    (2006.01)
*B60K 1/00*    (2006.01)

(52) U.S. Cl. ............... 180/208; 180/65.1; 180/68.5; 180/907

(58) Field of Classification Search ......... 180/208, 180/210, 216, 68.5, 907, 311, 312, 65.1
See application file for complete search history.

(56) References Cited

U.S. PATENT DOCUMENTS

| | | | | |
|---|---|---|---|---|
| 4,452,327 A * | 6/1984 | Mowat et al. | ............. | 180/11 |
| 4,798,255 A * | 1/1989 | Wu | ............. | 180/65.1 |
| 4,909,525 A * | 3/1990 | Flowers | ............. | 280/30 |
| 4,944,359 A * | 7/1990 | Doman et al. | ............. | 180/208 |
| 5,036,938 A * | 8/1991 | Blount et al. | ............. | 180/208 |
| 5,074,372 A * | 12/1991 | Schepis | ............. | 180/208 |
| 5,101,920 A * | 4/1992 | Peterson | ............. | 180/11 |
| 5,150,762 A * | 9/1992 | Stegeman et al. | ............. | 180/208 |
| 5,154,251 A * | 10/1992 | Fought | ............. | 180/208 |
| 5,240,086 A * | 8/1993 | Hopely, Jr. | ............. | 180/208 |
| 5,322,140 A * | 6/1994 | Bussinger | ............. | 180/65.1 |
| 5,333,702 A * | 8/1994 | Gaffney et al. | ............. | 180/208 |
| 6,170,592 B1 * | 1/2001 | Wu | ............. | 180/208 |
| 6,273,206 B1 * | 8/2001 | Bussinger | ............. | 180/208 |
| 6,336,517 B1 * | 1/2002 | Cheng | ............. | 180/208 |
| 6,439,331 B1 * | 8/2002 | Fan | ............. | 180/208 |
| 6,530,446 B1 * | 3/2003 | Lin | ............. | 180/208 |
| 6,699,616 B2 * | 3/2004 | Wu | ............. | 429/98 |
| 7,028,799 B2 * | 4/2006 | Lin | ............. | 180/208 |
| 7,044,249 B2 * | 5/2006 | Fan | ............. | 180/208 |
| 7,059,441 B2 * | 6/2006 | Chen | ............. | 180/208 |
| 7,234,557 B2 * | 6/2007 | Chen | ............. | 180/208 |
| 7,252,168 B2 * | 8/2007 | Lin et al. | ............. | 180/208 |

* cited by examiner

*Primary Examiner*—Christopher Bottorff
*Assistant Examiner*—George D. Spisich
(74) *Attorney, Agent, or Firm*—Alan Kamrath; Kamrath & Associates PA

(57) ABSTRACT

A vehicle body includes a front frame, a rear frame, a control unit, a fixing screw, a battery, and a locking unit. Thus, the rear frame is combined with and detached from the front frame easily and rapidly, thereby facilitating a user assembling and disassembling the vehicle body. In addition, the fixing hooks of the front frame are snapped onto the fixing stubs of the rear frame, and the locking hook of the control unit on the support post of the rear frame is locked in the locking hole of the front frame, thereby forming a three-point support structure by the fixing hooks, the fixing stubs and the locking hook, so that the rear frame is combined with the front frame rigidly and stably.

16 Claims, 6 Drawing Sheets

DETACHABLE VEHICLE BODY THAT IS ASSEMBLED AND DISASSEMBLED EASILY AND RAPIDLY

BACKGROUND OF THE INVENTION

1. Field of the Invention

The present invention relates to a vehicle body, and more particularly to a vehicle body for a wheeled vehicle, such as a motorcycle, a scooter or the like.

2. Description of the Related Art

A conventional vehicle body for a wheeled vehicle, such as a motorcycle, a scooter or the like, comprises a front frame, and a rear frame attached to the front frame. However, the rear frame is attached to the front frame by soldering, so that the vehicle body is not assembled easily, rapidly and conveniently, thereby causing inconvenience in assembly of the vehicle body, and thereby increasing costs of fabrication. In addition, the rear frame is attached to the front frame by soldering, so that the rear frame is not combined with the front frame rigidly and stably, thereby decreasing stability of the vehicle body.

SUMMARY OF THE INVENTION

In accordance with the present invention, there is provided a vehicle body, comprising a front frame, a rear frame, a control unit. The front frame has a rear end having a mediate portion provided with a support column having a locking hole and two sides each provided with a fixing hook. The rear frame is detachably mounted on the front frame and has a front end having a mediate portion provided with a support post and two sides each provided with a fixing stub onto which the respective fixing hook of the front frame is snapped. The control unit includes a rotation member rotatably mounted on the support post of the rear frame, and a locking hook mounted on the rotation member to move therewith and detachably locked in the locking hole of the support column of the front frame.

The primary objective of the present invention is to provide a detachable vehicle body that is assembled and disassembled easily and rapidly.

Another objective of the present invention is to provide a vehicle body, wherein the rear frame is combined with and detached from the front frame easily, rapidly and conveniently, thereby facilitating a user assembling and disassembling the vehicle body.

A further objective of the present invention is to provide a vehicle body, wherein the fixing hooks of the front frame are snapped onto the respective fixing stubs of the rear frame, and the locking hook of the control unit on the support post of the rear frame is locked in the locking hole of the support column of the front frame, thereby forming a three-point support structure by the fixing hooks, the fixing stubs and the locking hook, so that the rear frame is combined with the front frame rigidly and stably.

A further objective of the present invention is to provide a vehicle body, wherein the fixing screw is extended through the support post of the rear frame and screwed into the support column of the front frame, so that the rear frame is combined with the front frame rigidly and stably.

A further objective of the present invention is to provide a vehicle body, wherein the retaining plate of the locking unit is pressed by the locking hook of the control unit to push the locking bracket toward the battery, so that the locking portion of the locking bracket is locked in the locking bore of the battery so as to fix the battery on the front frame by the locking bracket.

Further benefits and advantages of the present invention will become apparent after a careful reading of the detailed description with appropriate reference to the accompanying drawings.

DETAILED DESCRIPTION OF THE INVENTION

Figure 1:
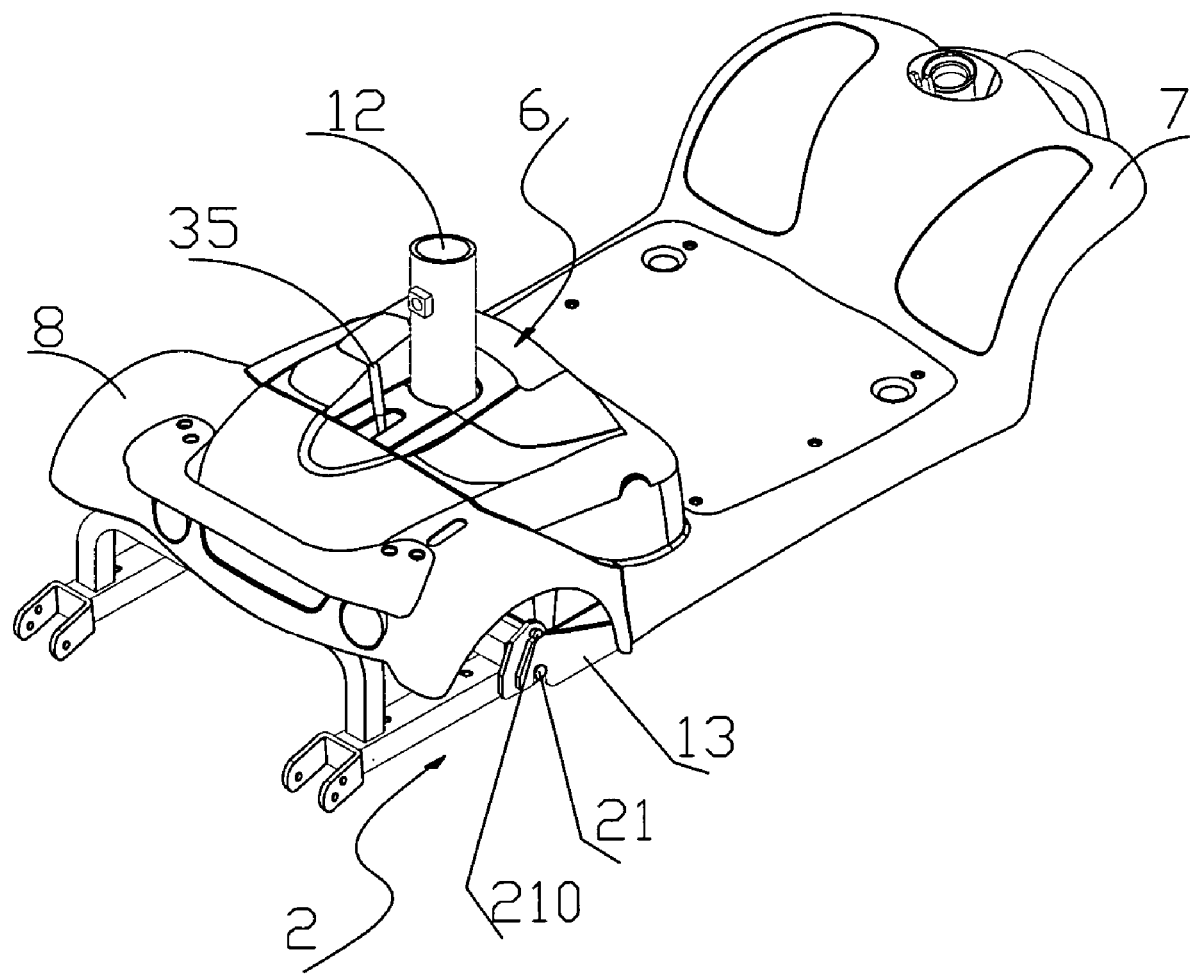
FIG. 1 is a perspective view of a vehicle body in accordance with the preferred embodiment of the present invention.
Figure 2:
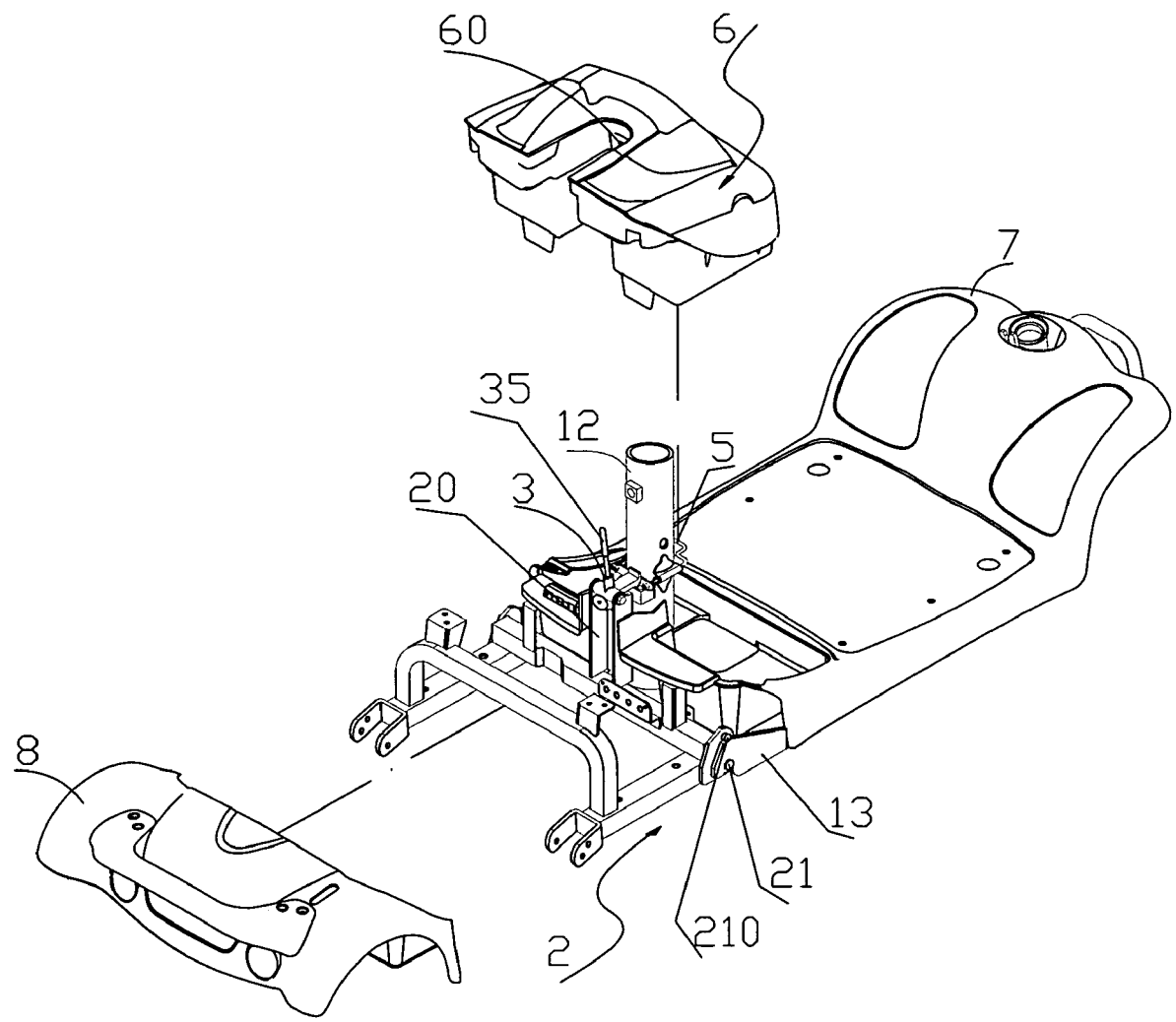
FIG. 2 is a partially exploded perspective view of the vehicle body as shown in FIG. 1.
Figure 3:
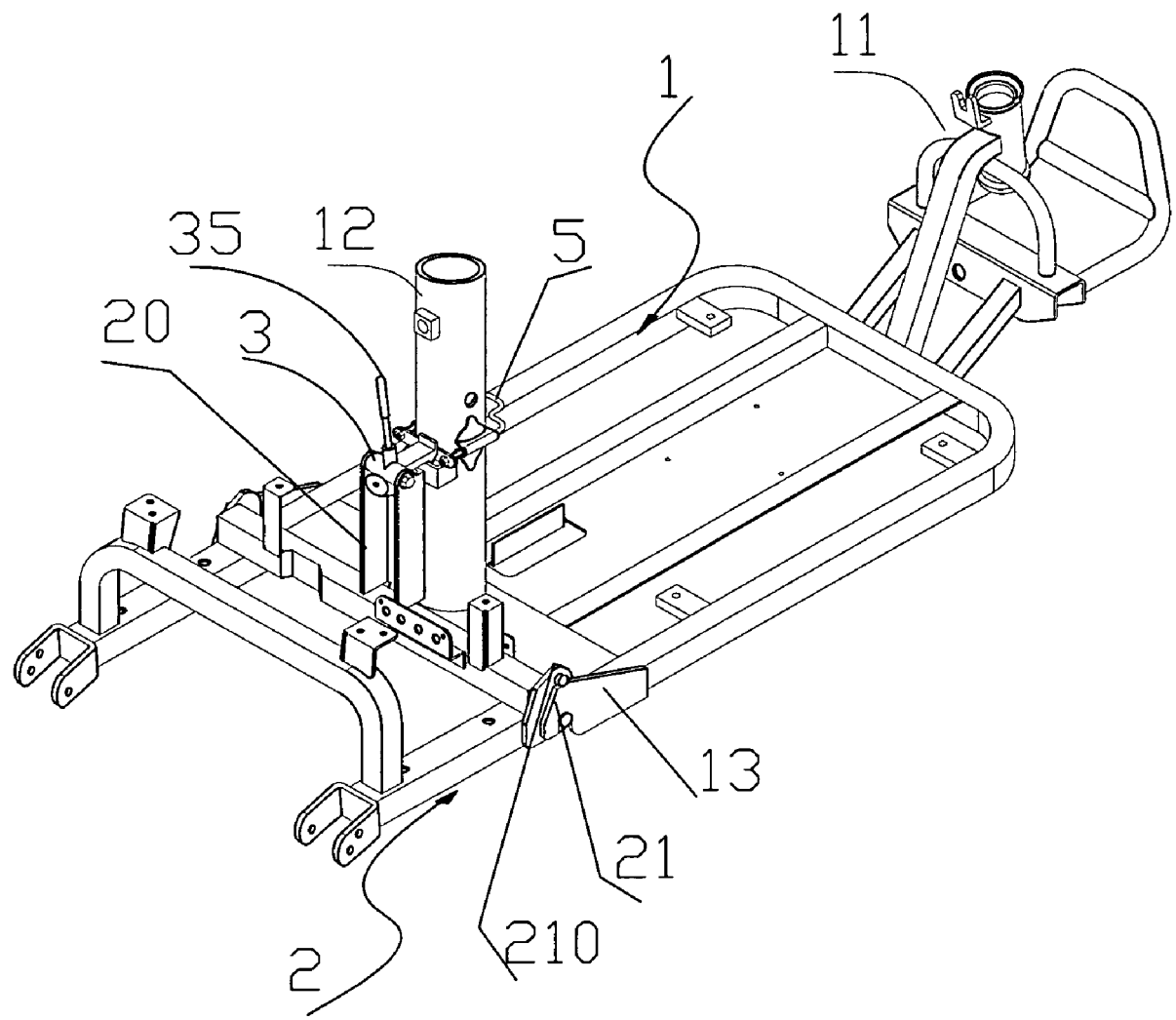
FIG. 3 is a partially perspective view of the vehicle body as shown in FIG. 1.

Referring to the drawings and initially to FIGS. 1-6, a vehicle body in accordance with the preferred embodiment of the present invention comprises a front frame 1, a rear frame 2, a control unit 3, a fixing screw 4, a battery 6, and a locking unit 5.

The front frame 1 has a front end provided with a head seat 11 connected to a rotation shaft, a propeller shaft and a steering lever not shown in the figures. The front frame 1 has a rear end having a mediate portion provided with a support column 12 having a locking hole 120 and two sides each provided with a fixing hook 13. A stepping board 7 is mounted on the front frame 1 to cover the front frame 1.

The rear frame 2 is detachably mounted on the front frame 1 and has a front end having a mediate portion provided with a support post 20 and two sides each provided with a fixing stub 21 onto which the respective fixing hook 13 of the front frame 1 is snapped and a retractable resting stub 210 rested on an edge of the respective fixing hook 13 of the front frame 1 so that the respective fixing hook 13 of the front frame 1 is secured to the fixing stub 21 of the rear frame 2 closely and exactly. The support post 20 of the rear frame 2 has a substantially U-shaped cross-sectional profile. The rear frame 2 is used to receive electronic elements, such as an engine, a motor, a circuit board or the like not shown in the figures. A cover 8 is mounted on the rear frame 2 to cover the rear frame 2.

The control unit 3 includes a substantially cylindrical rotation member 31 rotatably mounted on the support post 20 of the rear frame 2, a locking hook 30 mounted on the rotation member 31 to move therewith and detachably locked in the locking hole 120 of the support column 12 of the front frame 1, a control handle 35 mounted on an upper side of the rotation member 31 to control movement of the rotation member 31, an elastic member 34 mounted in the support post 20 of the rear frame 2 and biased between the rotation member 31 and the support post 20 of the rear frame 2 to provide a restoring force to the rotation member 31, and a receiving seat 36 mounted on a lower side of the rotation member 31 to receive the elastic member 34. The rotation member 31 is rotatably mounted on the support post 20 of the rear frame 2 by a bolt 32 and a nut 33 so that the rotation member 31 is rotatable about the bolt 32.

The fixing screw 4 is extended through the support post 20 of the rear frame 2 and abutting the support column 12 of the front frame 1.

The battery 6 is detachably mounted on the front frame 1 and has an inside formed with a locking bore 60 aligning with the support column 12 of the front frame 1.

Figure 4:
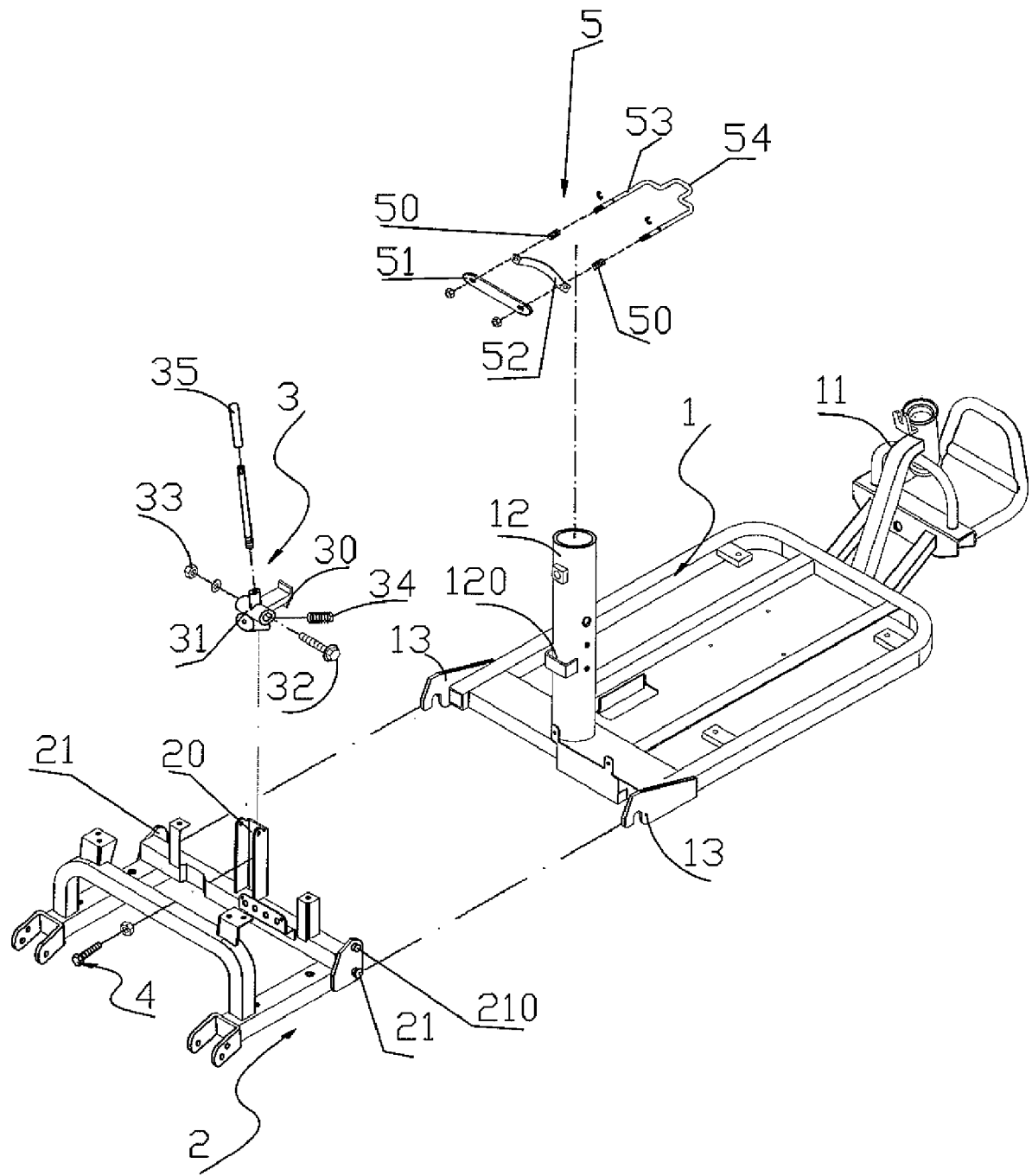
FIG. 4 is a partially exploded perspective view of the vehicle body as shown in FIG. 1.
Figure 5:
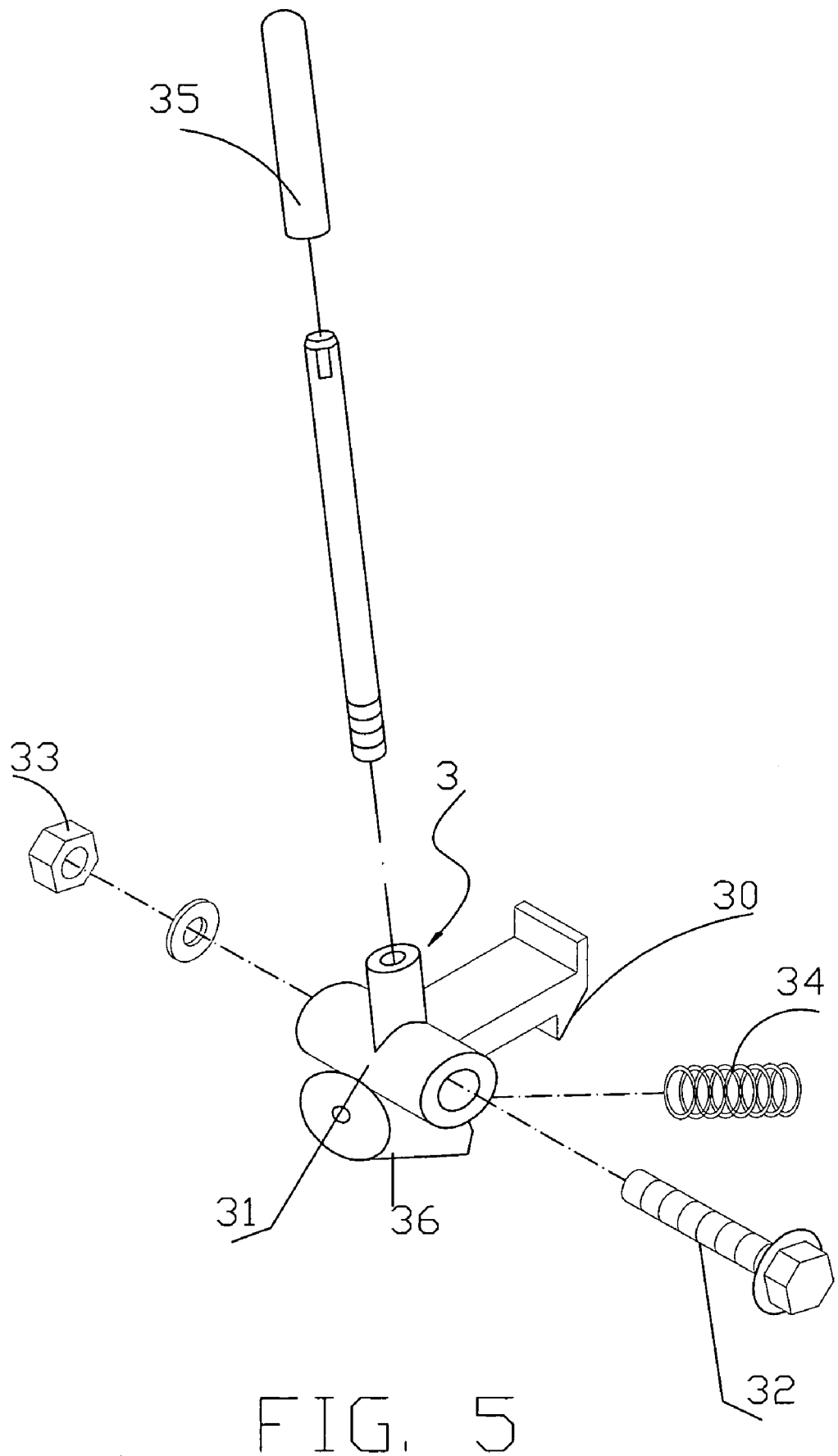
FIG. 5 is a partially exploded perspective view of the vehicle body as shown in FIG. 1.
Figure 7:
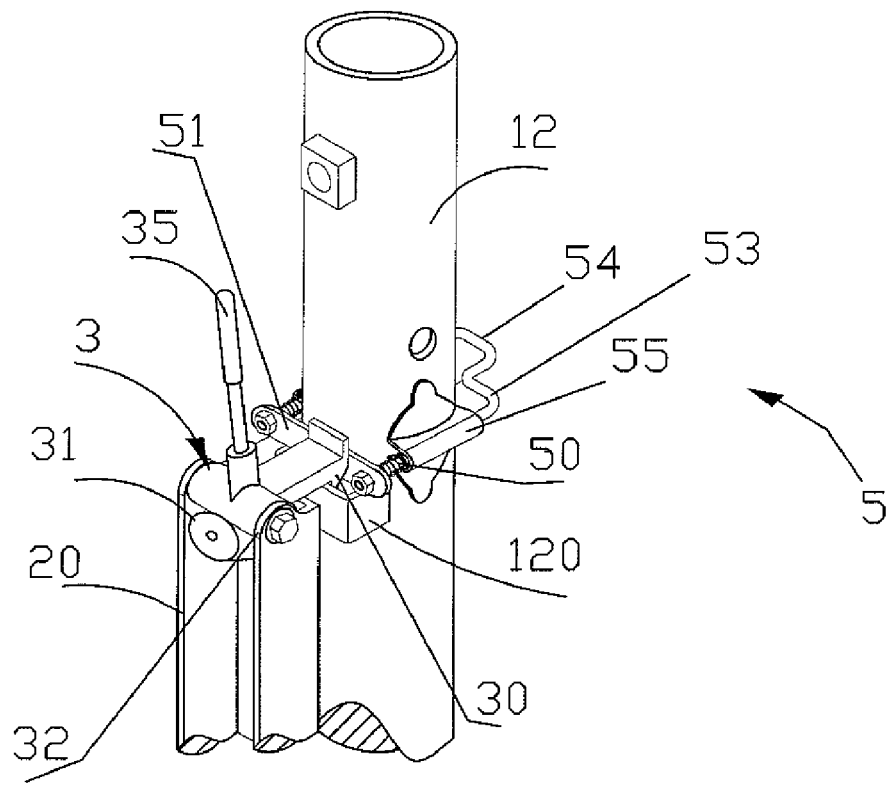
FIG. 7 is a partially perspective cross-sectional view of the vehicle body as shown in FIG. 1.
Figure 6:
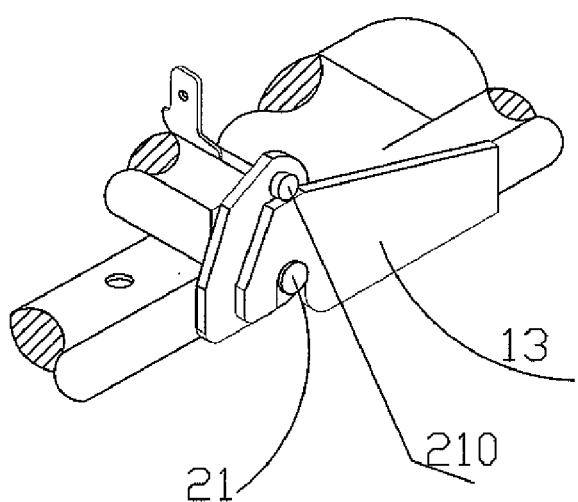
FIG. 6 is a partially perspective cross-sectional view of the vehicle body as shown in FIG. 1.

Referring to FIGS. 4 and 7, the locking unit 5 includes a locking bracket 53 movably mounted on the support column 12 of the front frame 1 and having a first end formed with a locking portion 54 detachably locked in the locking bore 60 of the battery 6, a retaining plate 51 mounted on a second end of the locking bracket 53 to move therewith and rested on the locking hook 30 of the control unit 3, and an elastic plate 52 mounted between the support column 12 of the front frame 1 and the retaining plate 51 to push the retaining plate 51 toward the locking hook 30 of the control unit 3.

The retaining plate 51 of the locking unit 5 is located above the locking hole 120 of the support column 12 and pressed by the locking hook 30 of the control unit 3 to push the locking bracket 53 toward the battery 6, so that the locking portion 54 of the locking bracket 53 is locked in the locking bore 60 of the battery 6 at a normal state. The locking bracket 53 of the locking unit 5 is substantially U-shaped and is formed by a bent bar. The retaining plate 51 and the locking bracket 53 of the locking unit 5 encircle the support column 12 of the front frame 1.

The locking bracket 53 of the locking unit 5 is movably mounted on the support column 12 of the front frame 1 by two support seats 55, and the locking unit 5 further includes two springs 50 each mounted on the locking bracket 53 and each biased between the retaining plate 51 and a respective one of the two support seats 55 to provide a restoring force to the locking bracket 53 to pull the locking bracket 53 outward relative to the battery 6 when the retaining plate 51 of the locking unit 5 is released from the locking hook 30 of the control unit 3, so that the locking portion 54 of the locking bracket 53 is detached from the locking bore 60 of the battery 6.

Referring to FIGS. 1-7, the fixing hooks 13 of the front frame 1 are snapped onto the respective fixing stubs 21 of the rear frame 2 and retained by the respective resting stub 210 of the rear frame 2, and the locking hook 30 of the control unit 3 on the support post 20 of the rear frame 2 is locked in the locking hole 120 of the support column 12 of the front frame 1, thereby forming a three-point support structure by the fixing hooks 13, the fixing stubs 21 and the locking hook 30, so that the rear frame 2 is combined with the front frame 1 rigidly and stably. In addition, the fixing screw 4 is extended through the support post 20 of the rear frame 2 and screwed into the support column 12 of the front frame 1, so that the rear frame 2 is combined with the front frame 1 rigidly and stably. In addition, the retaining plate 51 of the locking unit 5 is pressed by the locking hook 30 of the control unit 3 to push the locking bracket 53 toward the battery 6, so that the locking portion 54 of the locking bracket 53 is locked in the locking bore 60 of the battery 6 so as to fix the battery 6 on the front frame 1 by the locking bracket 53.

In detachment, the fixing screw 4 is detached from the rear frame 2 and the front frame 1, the fixing hooks 13 of the front frame 1 are detached from the respective fixing stubs 21 of the rear frame 2, and the locking hook 30 of the control unit 3 is detached from the locking hole 120 of the support column 12 of the front frame 1 by operation of the control handle 35, thereby releasing the rear frame 2 from the front frame 1 so that the rear frame 2 is detached from the front frame 1 easily and rapidly. At this time, the locking hook 30 of the control unit 3 is returned to the original state by the restoring force of the elastic member 34. In addition, when the locking hook 30 of the control unit 3 is detached from the locking hole 120 of the support column 12 of the front frame 1, the retaining plate 51 of the locking unit 5 is released from the locking hook 30 of the control unit 3, and the locking bracket 53 is pulled outward relative to the battery 6 by the restoring force of the two springs 50 so that the locking portion 54 of the locking bracket 53 is detached from the locking bore 60 of the battery 6, thereby detaching the battery 6 from the locking bracket 53.

Accordingly, the fixing hooks 13 of the front frame 1 are snapped onto the respective fixing stubs 21 of the rear frame 2, and the locking hook 30 of the control unit 3 on the support post 20 of the rear frame 2 is locked in the locking hole 120 of the support column 12 of the front frame 1, thereby forming a three-point support structure by the fixing hooks 13, the fixing stubs 21 and the locking hook 30, so that the rear frame 2 is combined with the front frame 1 rigidly and stably. In addition, the fixing screw 4 is extended through the support post 20 of the rear frame 2 and screwed into the support column 12 of the front frame 1, so that the rear frame 2 is combined with the front frame 1 rigidly and stably. In addition, the retaining plate 51 of the locking unit 5 is pressed by the locking hook 30 of the control unit 3 to push the locking bracket 53 toward the battery 6, so that the locking portion 54 of the locking bracket 53 is locked in the locking bore 60 of the battery 6 so as to fix the battery 6 on the front frame 1 by the locking bracket 53. In addition, the rear frame 2 is combined with and detached from the front frame 1 easily and rapidly, thereby facilitating a user assembling and disassembling the vehicle body.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A vehicle body, comprising a front frame, a rear frame, a control unit, wherein:
   the front frame has a rear end having a mediate portion provided with a support column having a locking hole and two sides each provided with a fixing hook;
   the rear frame is detachably mounted on the front frame and has a front end having a mediate portion provided with a support post and two sides each provided with a fixing stub onto which the respective fixing hook of the front frame is snapped;
   the control unit includes a rotation member rotatably mounted on the support post of the rear frame, and a locking hook mounted on the rotation member to move therewith and detachably locked in the locking hole of the support column of the front frame;
   the vehicle body further comprises:
   a battery detachably mounted on the front frame and having an inside formed with a locking bore aligning with the support column of the front frame;
   a locking unit including a locking bracket movably mounted on the support column of the front frame and having a first end formed with a locking portion detachably locked in the locking bore of the battery.

2. The vehicle body in accordance with claim 1, wherein each of the two sides of the front end of the rear frame is further provided with a resting stub rested on an edge of the respective fixing hook of the front frame so that the respective fixing hook of the front frame is secured to the fixing stub of the rear frame.

3. The vehicle body in accordance with claim 1, wherein the support post of the rear frame has a substantially U-shaped cross-sectional profile.

4. The vehicle body in accordance with claim 1, wherein the rotation member has a substantially cylindrical shape.

5. The vehicle body in accordance with claim 1, wherein the control unit further includes a control handle mounted on an upper side of the rotation member to control movement of the rotation member.

6. The vehicle body in accordance with claim 1, wherein the control unit further includes an elastic member mounted in the support post of the rear frame and biased between the rotation member and the support post of the rear frame to provide a restoring force to the rotation member.

7. The vehicle body in accordance with claim 6, wherein the control unit further includes a receiving seat mounted on a lower side of the rotation member to receive the elastic member.

8. The vehicle body in accordance with claim 1, wherein the rotation member is rotatably mounted on the support post of the rear frame by a bolt and a nut so that the rotation member is rotatable about the bolt.

9. The vehicle body in accordance with claim 1, further comprising a fixing screw extended through the support post of the rear frame and abutting the support column of the front frame.

10. The vehicle body in accordance with claim 1, wherein the locking unit further includes a retaining plate mounted on a second end of the locking bracket to move therewith and rested on the locking hook of the control unit.

11. The vehicle body in accordance with claim 10, wherein the locking unit further includes an elastic plate mounted between the support column of the front frame and the retaining plate to push the retaining plate toward the locking hook of the control unit.

12. The vehicle body in accordance with claim 10, wherein the retaining plate of the locking unit is located above the locking hole of the support column and pressed by the locking hook of the control unit to push the locking bracket toward the battery, so that the locking portion of the locking bracket is locked in the locking bore of the battery at a normal state.

13. The vehicle body in accordance with claim 10, wherein the locking bracket of the locking unit is movably mounted on the support column of the front frame by two support seats, and the locking unit further includes two springs each mounted on the locking bracket and each biased between the retaining plate and a respective one of the two support seats to provide a restoring force to the locking bracket to pull the locking bracket outward relative to the battery when the retaining plate of the locking unit is released from the locking hook of the control unit, so that the locking portion of the locking bracket is detached from the locking bore of the battery.

14. The vehicle body in accordance with claim 10, wherein the retaining plate and the locking bracket of the locking unit encircle the support column of the front frame.

15. The vehicle body in accordance with claim 1, wherein the locking bracket of the locking unit is substantially U-shaped and is formed by a bent bar.

16. The vehicle body in accordance with claim 1, wherein the fixing hooks of the two sides of the front frame, the fixing stubs of the two sides of the rear frame and the locking hook of the control unit form a three-point support structure between the rear frame and the front frame.

\* \* \* \* \*